United States Patent [19]

Bartholomew

[11] 3,938,871

[45] Feb. 17, 1976

[54] CASSETTE STORAGE DEVICE WITH ADJUSTABLE PARTITIONS

[75] Inventor: Allan E. Bartholomew, North Canton, Ohio

[73] Assignee: Myers Industries, Inc., Akron, Ohio

[22] Filed: Jan. 22, 1974

[21] Appl. No.: 435,478

[52] U.S. Cl. ............ 312/240; 206/387; 206/510; 312/111; 312/138 R; 312/244; 312/323; 312/324; 312/332; 312/348

[51] Int. Cl.² A47B 57/00; A47F 3/06; B65D 21/08; B65D 85/672

[58] Field of Search ......... 312/9, 10, 348, 332, 323, 312/324; 206/DIG. 36; 211/184

[56] References Cited
UNITED STATES PATENTS

| | | | |
|---|---|---|---|
| 1,729,401 | 9/1929 | Richards | 312/323 |
| 2,257,536 | 9/1941 | Roycroft | 211/184 |
| 3,385,643 | 5/1968 | Adell | 312/10 |
| 3,710,900 | 1/1973 | Fink | 312/10 |
| 3,807,572 | 4/1974 | Luvara et al. | 211/184 |

Primary Examiner—Paul R. Gilliam
Assistant Examiner—Carl F. Pietruszka
Attorney, Agent, or Firm—Oldham & Oldham

[57] ABSTRACT

A cassette or similar article storage cabinet including an open frame enclosure means including opposed sides having vertically spaced horizontally positioned support flanges. One or more flexible partition members having support flanges on opposite sidewalls thereof are removably engagable with the frame to provide support action. Different sized articles can be accepted by providing one or two parallel vertically extending partition members in the frame.

4 Claims, 8 Drawing Figures

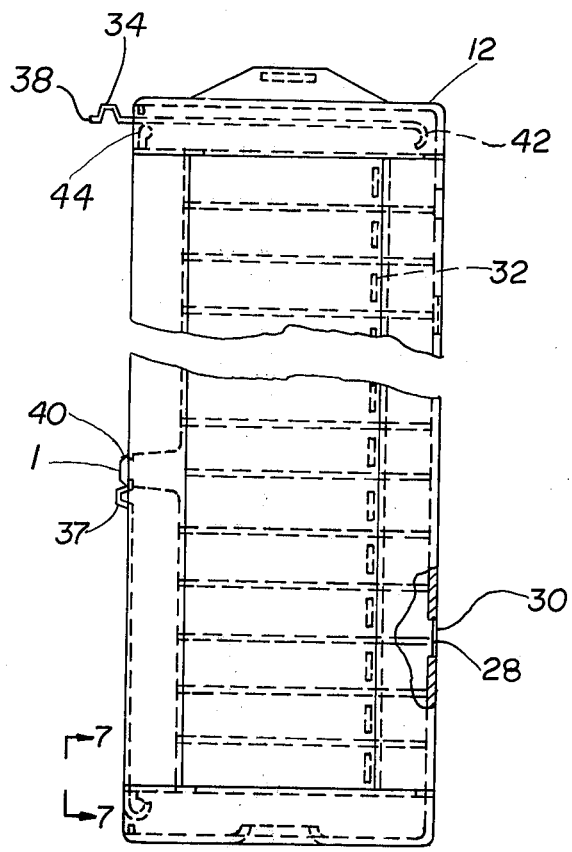
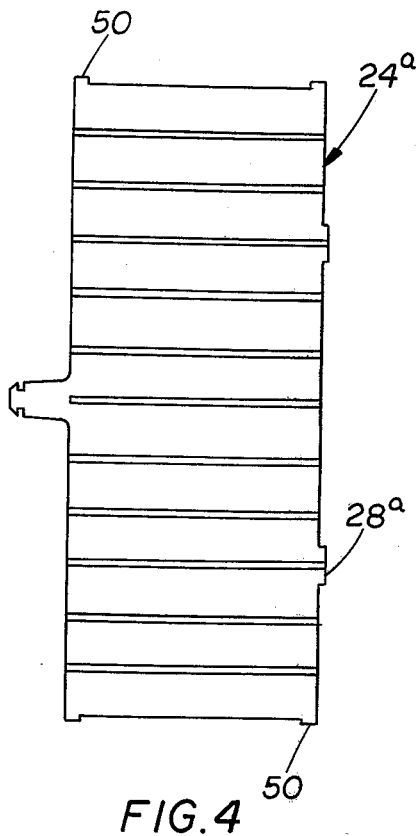
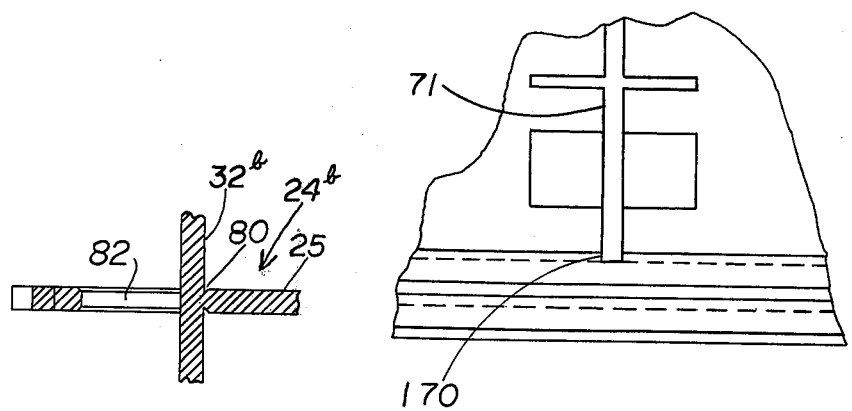

CASSETTE STORAGE DEVICE WITH ADJUSTABLE PARTITIONS

BACKGROUND OF THE INVENTION

Heretofore there have been many different types of storage cabinets or the like provided. However, frequently it is desirable to use such a storage cabinet for storing articles therein of different sizes or, when the cabinet is made, it will not be known what sizes of articles are to be stored therein. Hence various efforts have been made to provide adjustable shelves and partition means in cabinets but all of such structures have been relatively costly to make, or they have been difficult to use or to adjust for receiving articles therein. Yet a further problem with storage cabinets is to provide one that does not have loose components therein that can be lost or broken and destroy the operativeness and effectiveness of the cabinets.

The general object of the present invention is to provide a novel and improved storage cabinet or device particularly adapted for storing tape cassettes therein and which cabinets are characterized by the provision of an extra partition member therefor to make the device of a size for receiving either of two different sizes of cassettes therein depending upon the number of partition members used in the cabinet.

Another object of the invention is to provide a sturdy low cost but dependable storage device for articles, such as tape cassettes, and wherein the storage device is made from a plurality of molded members and with the cabinet having substantially no removable or loose parts therein.

A further object of the invention is to provide a storage cabinet specifically adapted to receive either small or large cassettes therein depending upon the use of one or two removable vertically extending partition members in the storage cabinet and forming a portion of the storage means therefor.

Another object of the invention is to provide an attractive inexpensive storage cassette cabinet and wherein movable front closure means are provided in the unit and wherein the partition members are flexible in one direction and they can be readily engaged with and disengaged from the cabinet as desired.

The foregoing and other objects and advantages of the invention will be made more apparent as the specification proceeds.

Reference now is particularly made to the accompanying drawings, wherein:

FIG. 2 is a side elevation of a storage device of FIG. 1 with a portion thereof removed and shown in vertical section;

FIG. 4 is a side elevation of a modification of the partition member shown in FIGS. 1 and 2 of the drawings;

FIG. 7 is a fragmentary elevation of a portion of a modified storage unit; and

FIG. 8 is a fragmentary vertical section of a modified partition.

When referring to corresponding members shown in the drawings and referred to in the specification, corresponding numerals are used to facilitate comparison therebetween.

SUBJECT MATTER OF THE INVENTION

Figure 1:
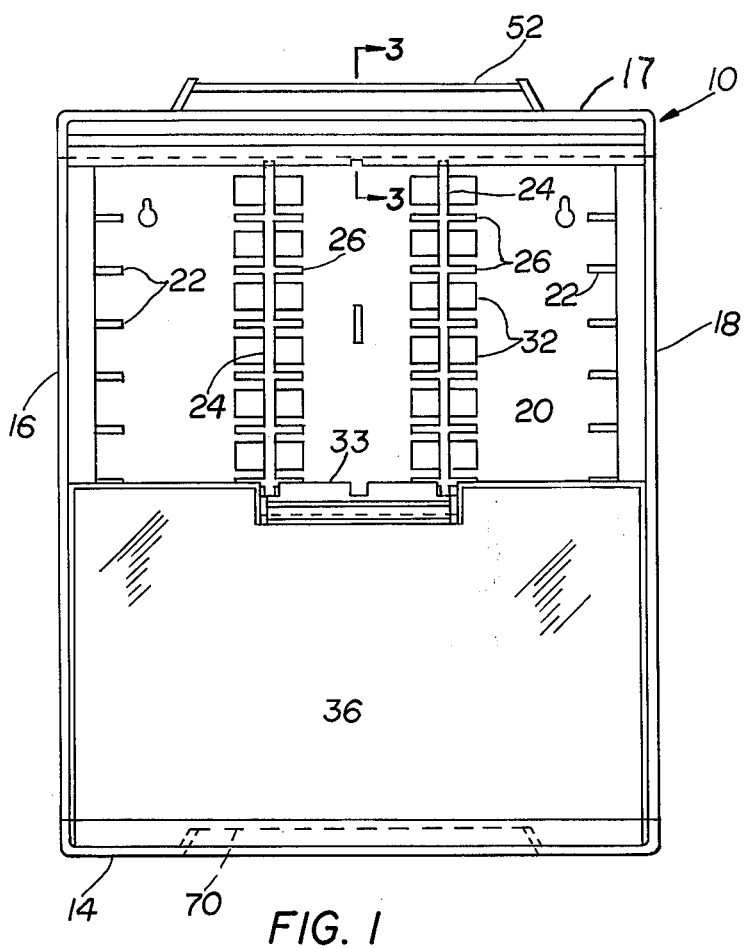
FIG. 1 is a front elevation of a cassette storage device embodying the principles of the invention with one cover member being shown in its closed position.
Figure 3:
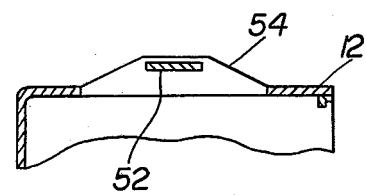
FIG. 3 is a fragmentary vertical section through the top of the storage device taken on line 3—3 of FIG. 1.
Figure 6:
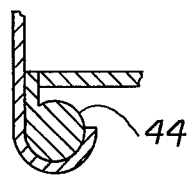
FIG. 6 is a sectional detail of the hinge means on the cover for the cassette.

A molded plastic storage cabinet which is adapted to receive articles of at least two different sizes therein is provided and includes a frame formed from a top, a bottom, and opposite sides, the frames having an open front, and closure means slidably engaging the frame and movable to a position covering the open front thereof. The sides have vertically spaced horizontal support flanges on the inner walls thereof, and a flexible, vertically positioned partition member extends depthwise of the frame and engages the same, the partition member having support flanges on both sides thereof aligned with the side wall support flanges for receiving articles and positioning them on both sides of the partition member, the partition member being deflectable in a lateral direction for removable engagement with the frame by protruding lugs formed on the partition member and engaging slots or recesses provided in the frame means.

Reference now is made to the details of the construction shown in the drawings, and a storage cabinet is indicated as a whole by the numeral 10. This cabinet 10 is preferably made from molded plastic components suitably secured together in a conventional manner for forming a unitary structure. The storage cabinet is particularly adapted to receive articles such as tape cassettes therein. These cassettes commercially are made today in either a small or large size, and the cabinet of the invention is adapted to receive and store either the smaller or the larger tape cassettes as desired.

The cabinet includes a frame formed from a top 12, a bottom 14, and opposite sides 16 and 18 as well as a back member 20. Each of these sides 16 and 18 has a plurality of vertically spaced, horizontal support flanges 22 formed on the inner walls thereof and extending depthwise of the cabinet.

To complete the storage area of the cabinet, one or more flexible, vertically positioned partition members 24 is provided and it extends depthwise of the frame. In the particular embodiment of the invention shown in FIG. 1, two identical partition members 24 are provided in parallel relationship spaced equally from each other and the sides of the frame. These partition members 24 each have a continuous vertical center wall and flat support flanges 26 on the sides thereof and these support flanges 26 are horizontally aligned with the flanges 22 on the sides of the cabinet to provide spaced support flanges for engaging the stored articles, particularly tape cassettes. Each of the partition members 24 has a plurality of protruding flat lug means or members thereon and one such lug member 28 is shown in FIG. 2 as engaging a slot or recess 30 formed in the back 20 of the cabinet. Similar lugs are provided on the top and bottom margins of each partition member for removably engaging slots provided in the top and bottom of the cabinet, respectively.

All of the components of the cabinet 10 are made from suitable moldable plastic material such as styrene, or other similar materials to form a relatively hard, durable cabinet means. However, even though the partition member 24 is relatively sturdy and can support light loads thereon, the construction of the partition member is such that it is flexible in a lateral direction so that by deflection of the partition member, the top and bottom lugs provided thereon can be disengaged from their receiving slots provided in the cabinet frame means for engaging the partition member therewith or removing it therefrom when temporary laterally directed distortion forces are applied to the partition member intermediate the top and bottom thereof.

The smaller tape cassettes to be stored in the cabinet 10 normally do not extend the depth of the cabinet 10. Hence, the partition members 24 usually have vertically spaced, short stops or flanges 32 formed on and extending laterally from the partition member in both directions adjacent the rear edge thereof, but spaced therefrom, as indicated in FIGS. 1 and 2 of the drawings. These flanges 32 are not continuous and are positioned between and spaced vertically from adjacent pairs of the support flanges 26 on the partition member whereby the flanges 32 do not interfere with the lateral bending or flexibility of the partition members 24.

Since it is desirable to enclose the cabinet 10 and the contents thereof at some times, a pair of closure members 34 and 36 are present in the cabinet with one closure 34 being the top closure and the closure 36 being at the bottom of the cabinet. Such closures slidably engaged with suitable slotted portions or front openings are provided in the cabinet 10 adjacent the top and bottom thereof. Each of these closures 34 and 36 has an outwardly extending short center handle section 37 provided thereon terminating in a flange edge 38 which is adapted to be snapped into or seated in slots or recesses 40 individually positioned in opposed vertical edges of a short protuberance 41 formed on each of the partition members 24. Hence, the closures can be removably engaged, when closed, with the partition members to provide an attractive appearance for the cabinet and to protect the contents of the cabinet from dust and other contaminates.

The closures 34 and 36 each have an arcuately shaped rear edge 42 formed thereon which engages a cylindrically shaped rib 44 provided on the front portion of the cabinet adjacent the top and bottom thereof for pivotal engagement of the edges 42 of the closures therewith. Thus one can slide the closures out of the cabinet and swing the closures through an arc from a horizontal inoperative position up to a vertical operative position, as indicated in FIG. 2. The ribs 44 usually extend about the width of the cabinet and are formed on members adjacent the top and bottom thereof and on one margin of the slotted front openings in the cabinet for receiving such sliding closures.

A modified type of a partition member 24a is shown in FIG. 4. In this instance, a plurality of support flanges 26a are provided on the partition member and extend the depth thereof. The partition member has a number of lugs 28a on the back edge thereof for engaging with slots in a cabinet back to position the partition member. The partition member 24a is also provided with protruding lugs 50 at the top and bottom edges thereof for removable engagement with recesses or slots in top and bottom parts of the cabinet. Lugs similar to the lugs 50 are also provided on the partition member 24, but are not clearly shown in the drawings.

Figure 5:
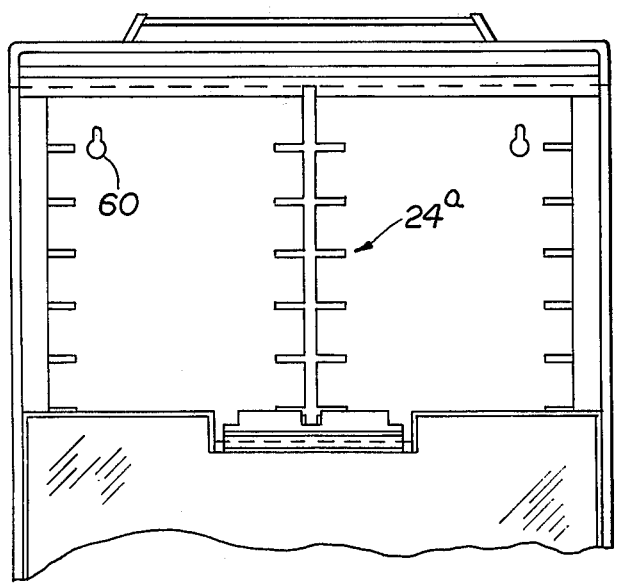
FIG. 5 is a fragmentary elevation of a storage device of FIG. 1 modified for use with different sized articles therein.

It should be noted that the partition member 24a has no members thereon equivalent to the flanges 32 so that longer depth cassettes can be received in the cabinet 10 when the one partition member 24a is positioned therein, as indicated in FIG. 5.

The top 12 normally has an integral handle 52 formed in an elevated center section thereof. The handle is defined by hand receiving openings 54 formed at each side of the central handle section to facilitate grasping and moving the cabinet.

The back of the cabinet normally has keyhole shaped slots 60 provided therein whereby the cabinet can be hung onto nails or equivalent members on a wall, if desired.

Normally the bottom 14 of the cabinet frame is recessed as indicated at 70 for receipt of the elevated handle section on a lower cabinet if two cabinets are stacked on top of each other.

It should also be understood that the partition members 24, which are made from styrene or other rather brittle plastic material can have the flanges 32 snapped or broken therefrom. Hence, the partition member 24 would then be of the same shape and style as the partition 24a shown in FIG. 4. Thus, the cabinet member could originally be made and sold with two partition members 24 for receiving the smaller, shorter cassettes therein, but one partition member could be removed and stored while the other partition member could be removed by laterally directed forces applied thereto, the flanges 32 be broken therefrom and then the partition member could be reassembled to provide a center partition and the structure shown in FIG. 5 for the larger cassettes. Or the cabinet could be provided initially with the two partitions 24 and the one partition 24a for alternate use as desired.

By the structure of the invention, a relatively sturdy, low cost plastic cabinet member having adjustable storage compartments therein for receiving either of two sizes of articles is provided.

The portions or parts of the cabinet frame can be secured together by suitable adhesives or in other manners, as by use of sonic welding or making the parts molded to such shapes as to mechanically interlock or snap together, as desired.

It will be realized that the storage device of the invention can be used in any position as on its side, also back down (or horizontal) as on a car seat, etc., but normally the cabinet would be positioned as shown in the drawings and reference is made to the relationship of the parts in regard to a vertical positioning of the member.

In some instances, it may even be desirable to form the flanges 22 on a separate partition member and just extending laterally therefrom on one side of the partition and then have this partition movably engage with the cabinet frame.

Furthermore, the cabinet top and base could be provided with grooves as indicated at 170 in FIG. 7 and in that instance, then the partition members 71 used could be rigid and just have sliding engagement with top and bottom portions of the cabinet. But, usually the partitions would have some lateral flexibility for frame engaging or release action. Obviously, the cabinet frame structure still would be adapted to provide slide grooves properly positioned for either engaging one center partition member, or two spaced center partitions, as well as any side or edge partitions as may be used. The partitions preferably all have the stop flanges 32 initially formed thereon.

While the invention has been particularly described with relation to a molded storage cabinet, it is possible that the cabinet can be made from metal, pressed board or other substances, as desired.

In some instances, it may even be desirable to provide more partitions than those shown in the embodiment of the drawings. However, still the partitions and the partition engaging means provided on the cabinet would be adapted to receive the partitions removably whereby the size of the article being received and the number of articles received can be varied.

In the cabinet shown, usually the sides 16, 18, the back 20 and the top 17 can be formed as a unit, or the cabinet members can be otherwise formed and be secured together. By forming separate frame or cabinet members, it can be shipped in knocked down conditions and then be secured together, as by mechanical interlocks at the point of use.

FIG. 8 shows a modified partition 24b having stops or flanges 32b thereon. The flanges 32b are made more easily removable by notches 80 where the flanges engage the vertical wall 25 in the partition and by an aperture 82 in such wall.

The articles adapted to be stored in the storage device are tape cartridges or cassettes and some looseness or freedom is provided in the positioning of these articles between the partitions on the support flanges provided whereby if the cassettes, cartridges, or tapes are jacketed, they still can be received in the storage spaces provided.

The device of the invention is of low cost, but sturdy construction and is readily adapted for use in storing a number of articles of preselected sizes therein. Any molded components of the device are designed for ready release from the mold by suitable draft angles such as 1° provided thereon as on the flanges 26. Hence, the objects of the invention are thought to be achieved.

While several complete embodiments of the invention have been disclosed herein, it will be appreciated that modification of these particular embodiments of the invention may be resorted to without departing from the scope of the invention.

What is claimed is:

1. A molded plastic storage cabinet for receiving articles of varied sizes comprising
    a frame including a top, a bottom, and opposed sides, which frame has an open front, said sides having vertically spaced support flanges on the inner walls thereof, a removable vertical partition member extending the height of the frame and depthwise thereof, said partition member having support flanges on the sides thereof aligned with said side wall support flanges for support of articles on both sides of the partition member, said partition member being laterally deflectible intermediate its upper and lower edges for removable engagement with said frame,
    said top including an integral elevated elongated handle section defined by hand receiving openings formed in said top on opposed sides of such handle section,
    two cover members individually slidably engaging the frame adjacent either the top or the bottom thereof for operatively enclosing the front of said frame, each cover member having an arcuately shaped rear edge, a pair of transversely extending cylindrically shaped ribs on the front portion of the cabinet, one for each cover member, to engage said arcuately shaped rear edge of a said cover member for controlled pivotal movement, and means on a front portion of said partition member to engage edges of said cover members to aid in retaining them in closed position.

2. A molded plastic storage cabinet for receiving articles of varied sizes comprising
    a frame including a top, a bottom, and opposed sides, which frame has an open front, said sides having vertically spaced support flanges on the inner walls thereof, a removable vertical partition member extending the height of the frame and depthwise thereof, said partition member having support flanges on the sides thereof aligned with said side wall support flanges for support of articles on both sides of the partition member, said partition member being laterally deflectible intermediate its upper and lower edges for removable engagement with said frame,
    said partition member having a center wall and laterally directed, vertically extending stop flanges on said center wall adjacent but spaced from a rear edge thereof, said stop flanges being positioned intermediate and spaced from each vertically adjacent pair of support flanges thereon and extending into a storage area formed therebetween to contact articles moved into said storage area, and notches are formed at the connection of said stop flanges to said center wall at one face of said flanges, and an aperture is formed in said center wall at the other face of said center wall to facilitate breaking off said flanges.

3. A molded plastic storage cabinet for receiving articles of either of two selected sizes comprising
    a frame including a top, a bottom, and opposed sides, which frame has an open front, said sides having vertically spaced support flanges on the inner walls thereof, a removable flexible vertical partition member extending the height of the frame and depthwise thereof, said partition member having support flanges on the sides thereof aligned with said side wall support flanges for support of articles on both sides of the partition member, said partition member being laterally deflectible intermediate its upper and lower edges for removable engagement with said frame,
    said partition member having a center wall and laterally directed, vertically extending flat surfaced stop flanges on said center wall intermediate the front and rear thereof but adjacent to and spaced from a rear edge thereof, said stop flanges being positioned intermediate and spaced vertically from each vertically adjacent pair of support flanges to permit lateral deflection of said partition member, said stop flanges extending into a storage area formed between each vertically adjacent pair of said support flanges to contact and stop articles being moved into such storage area, the said storage areas being adapted to receive one size of article when abutted against said stop flanges and to receive the other and larger size articles when said stop flanges are removed.

4. A molded plastic storage cabinet as in claim 3 where said top includes an integral elevated elongated plastic handle section forming a portion of said top and defined by hand receiving openings formed in said top on opposed sides of said handle section.

* * * * *